United States Patent [19]
Tajima et al.

[11] Patent Number: 5,497,059
[45] Date of Patent: Mar. 5, 1996

[54] CONTROL METHOD AND APPARATUS FOR A SERVO-MECHANISM

[75] Inventors: Fujio Tajima, Tsuchiura; Hideki Tanaka, Toyohashi; Kooetsu Okuyama, Tsuchiura; Tomokazu Ishii, Niihari; Kenji Toki, Odawara, all of Japan

[73] Assignee: Hitachi, Ltd., Tokyo, Japan

[21] Appl. No.: 322,411

[22] Filed: Oct. 4, 1994

Related U.S. Application Data

[63] Continuation of Ser. No. 948,266, Sep. 21, 1992, Pat. No. 5,352,961.

[30] Foreign Application Priority Data

Sep. 20, 1991 [JP] Japan ................... 3-268777

[51] Int. Cl.⁶ .................................................. G05B 17/02
[52] U.S. Cl. ........................ 318/561; 318/560; 318/609; 318/603
[58] Field of Search ................ 318/16, 7, 9, 560–646; 364/160–179; 360/70–88

[56] References Cited

U.S. PATENT DOCUMENTS

| | | | |
|---|---|---|---|
| 3,667,290 | 6/1972 | Hohn | 73/133 |
| 3,758,762 | 9/1973 | Littman et al. | 318/561 |
| 4,195,337 | 3/1980 | Bertrand et al. | 318/561 |
| 4,214,301 | 7/1980 | Kurihara et al. | 318/561 |
| 4,466,054 | 8/1984 | Shigemasa et al. | 318/610 X |
| 4,539,633 | 9/1985 | Shigemasa et al. | 318/561 X |
| 4,563,734 | 1/1986 | Mori et al. | 318/610 X |
| 4,603,284 | 7/1986 | Perzley | 318/568 |
| 4,679,136 | 7/1987 | Shigemasa | 318/561 X |
| 4,742,285 | 5/1988 | Sasaki et al. | 318/632 |
| 4,786,992 | 11/1988 | Tajima et al. | 318/7 |
| 4,791,548 | 12/1988 | Yoshikawa et al. | 318/561 |
| 4,792,737 | 12/1988 | Goff et al. | 318/615 |
| 4,827,227 | 5/1989 | Hayden et al. | 331/179 |
| 4,843,293 | 6/1989 | Futami | 318/609 |
| 4,912,753 | 3/1990 | Evans | 364/513 |
| 4,929,874 | 5/1990 | Mizuno et al. | 318/128 |
| 4,959,767 | 9/1990 | Buchner et al. | 364/151 |
| 5,032,938 | 7/1991 | Tajima et al. | 360/73.09 |
| 5,094,127 | 3/1992 | Ishida et al. | 74/866 |
| 5,111,124 | 5/1992 | Kurosawa | 318/434 |
| 5,155,422 | 10/1992 | Sidman et al. | 318/560 |
| 5,155,797 | 10/1992 | Nomura et al. | 388/815 |
| 5,229,896 | 7/1993 | Tohyama | 360/78.07 |
| 5,359,269 | 10/1994 | Wedeen et al. | 318/432 |

FOREIGN PATENT DOCUMENTS

| | | |
|---|---|---|
| 60-218106 | 10/1985 | Japan. |
| 3-63704 | 3/1991 | Japan. |

*Primary Examiner*—Paul Ip
*Attorney, Agent, or Firm*—Antonelli, Terry, Stout & Kraus

[57] ABSTRACT

A servo-mechanism control system calculates an operation value to be applied to a control object from a desired value of a control output and a detected control output of the control object, and drives the control object based on the calculated operation value so that the control output becomes equal to the desired value. The control system is less sensitive to the variation of characteristics of the control object and disturbances, and stable control is accomplished by a simple circuit arrangement. A mathematical model and its inverse function, which are based on the assumption that the control system is not subjected to the variation of characteristics of the control object and disturbances, are used to calculate a model-based control output. In error of the operation value is calculated from the difference between the model-based control output and the detected control output by using the inverse function of the mathematical model, and the operation value applied to the control object is modified by subtracting the error from the calculated operation value. Alternatively, the model-based operation value is calculated from the detected control output by using only the inverse function of the mathematical model, and the operation value is modified based on the difference between the model-based operation value and the calculated operation value.

7 Claims, 12 Drawing Sheets

CONTROL METHOD AND APPARATUS FOR A SERVO- MECHANISM

This is a continuation of application Ser. No. 948,266 filed on Sep. 21, 1992 now U.S. Pat. No. 5,352,961.

BACKGROUND OF THE INVENTION

This invention relates to a control method and apparatus for a servo-mechanism, and particularly to a control method and apparatus for a servo-mechanism used in a plant or used in a machine tool, magnetic tape memory unit or disk memory unit.

The control system of the above-mentioned servo-mechanism is required to respond quickly and accurately. In order to fulfill these demands, the control system is designed to have characteristics of high sensitivity, and the system is sensitive even to the variation of characteristics of the control object and to disturbances, and consequently the system inherently involves a problem of instability.

A method of dealing with this matter is disclosed in Japanese patent publication JP-A-60-218106. The control system based on this method includes a dynamic model 36 of a control object 1, an output error compensator 37, and subtracters 65 and 66, in addition to a control operator 38 which calculates an operation value $U_A$ from the difference between a desired value R and a control output Y of a control object, as shown in FIG. 12.

In the control system of FIG. 12, the dynamic model 36 receives the desired value R and produces an output $Y_M$ which represents a control output based on the assumption that the control object 1 does not vary in characteristics and the system is not subjected to disturbances. Accordingly, the difference E between the output $Y_M$ of the dynamic model 36 and the actual control output Y of the control object 1, as evaluated by the subtracter 66, is assumed to be attributable to the variation of characteristics of the control object and the variation of the control output caused by disturbances D. The output error Compensator 37 converts the difference E into a variation component Uc of the operation value Y due to variations in characteristics and disturbances, and the subtracter 65 subtracts the value Uc from the calculated operation value $U_A$ thereby to produce a modified operation value U.

Since the modified operation value U is rid of the variation component Uc caused by the variation of characteristics of the control object and disturbances, the control system is less sensitive to the variation of characteristics of the control object and disturbances, while it is highly responsive to the variation of desired value R, and the control system can be stabilized.

A similar technique is disclosed in JP-A-3-63704.

However, these conventional control systems necessitate a complex output error compensator when it is intended to compensate the operation value against wide variations of characteristics of the control object.

Further, for example, the arrangement of FIG. 12 excluding the control object 1 and dynamic model 36 is not much dependent on the control object, and it is desirably of common design for a variety of control objects. In addition, such an arrangement is based on accumulation of knowledge and know how in design, and thus it is desirable to use it in common with different control objects. In this respect, the control system of the patent publication JP-A-60-218106 supplies the dynamic model 36 with the desired value R for its input, and therefore it is not suited to standardize the controller for a variety of control objects merely by attaching a control object to the common control portion. On the other hand, in order to comprehend the variation of characteristics among control objects, it is desirable to calculate the model-based control output which is closely associated with the control object.

SUMMARY OF THE INVENTION

An object of this invention is to provide a control method and apparatus for a servo-mechanism which can readily be applied to a variety of control objects.

Another object of this invention is to provide a control method and apparatus for a servo-mechanism which perform control by being less influenced by the variation of characteristics of a control object and by disturbances while being simple in structure.

The present invention resides in a control method for a servo-mechanism in which the operation value is calculated from the actual control output of the control object and the desired value of the control output and the control object is driven in accordance with the calculated operation value so that the control output becomes equal to the desired value, wherein a model-based control output is calculated, taking the operation value to be inputted to the control object as an input, by using a model transfer function which is the ratio of the control output to the operation value to be applied to the control object having a designed value in the absence of disturbances, the error of a operation value is calculated from the difference between the model-based control output and the actual control output by using the inverse function of the model transfer function, and the operation value applied to the control object is evaluated by subtracting the operation value error from the calculated operation value.

The present invention further resides in a control method for a servo-mechanism in which the operation value is calculated from the actual control output of the control object and the desired value of the control output and the control object is driven in accordance with the calculated operation value so that the control output becomes equal to the desired value, wherein a model-based operation value is calculated, taking the control value detected from the control object as an input, by using the inverse function of a model transfer function which is the ratio of the control output to the operation value to be applied to the control object having a designed value in the absence of disturbances, the error of the operation value is calculated from the difference between the model-based operation value and the operation value applied to the control object, and the operation value applied to the control object is evaluated by subtracting the operation value error from the calculated operation value.

By calculating the operation value error from the operation value based on a mathematical model, the arrangement of the processor is simplified. The control system is rid of the influence of excessive operations of the load and high-frequency noises by treating the operation value error with a low-pass filter, and the system can be stabilized.

DESCRIPTION OF THE PREFERRED EMBODIMENTS

Figure 1:
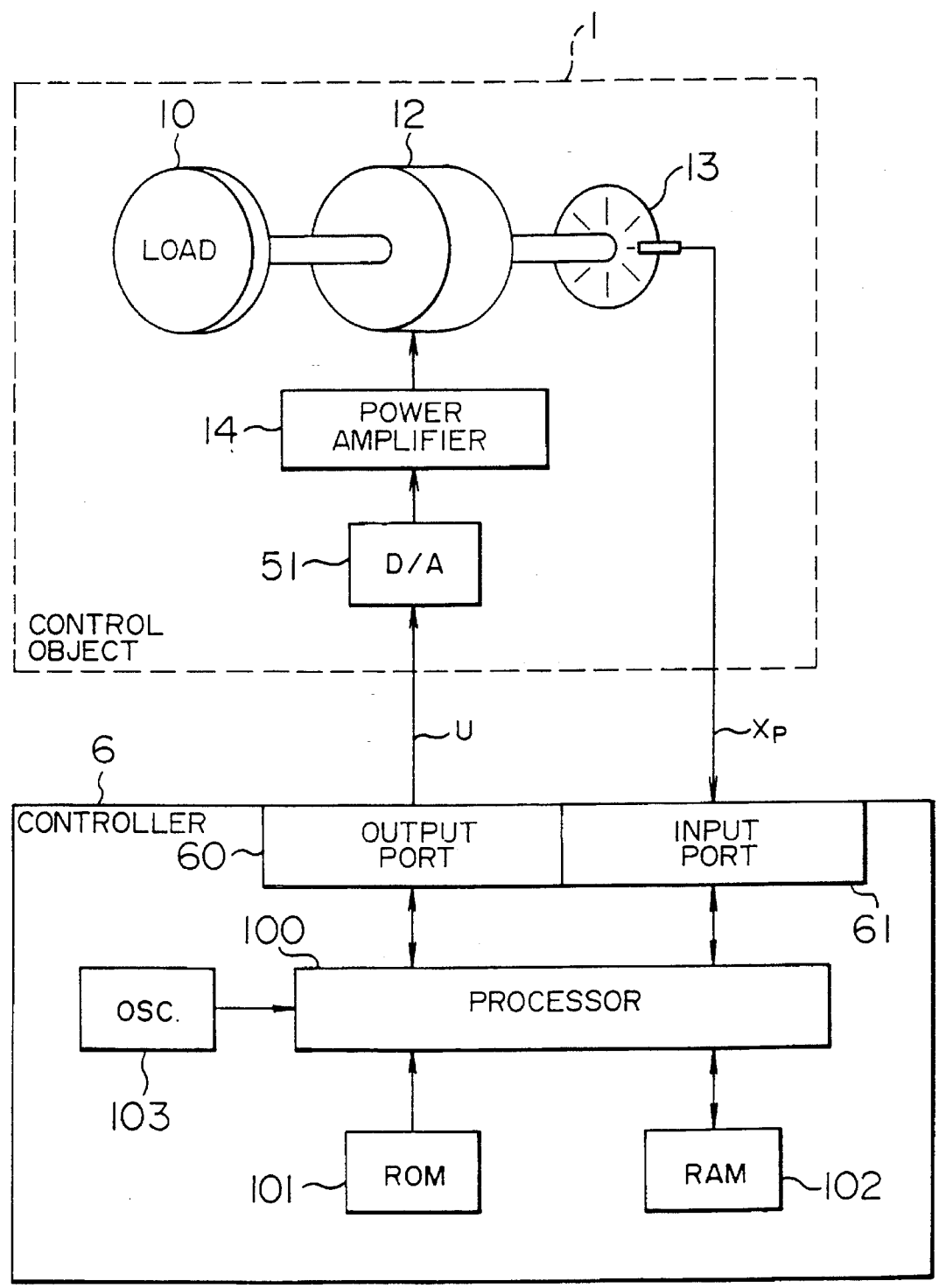
FIG. 1 is a block diagram showing in brief the overall arrangement of the control system for a servo-mechanism based on this invention.

Embodiments of this invention will now be described in detail. FIG. 1 is a block diagram showing the overall arrangement of this invention, in which a control object 1 consists of a rotational load 10, a motor 12 which rotates the load, a pulse generator (rotary encoder) 13 which detects the rotational position of the motor, and a power amplifier 14. In case the load 10 is of the linear motion type, a linear-motion motor such as a voice-coil motor and a linear position detector may be used in place of the motor 12 and pulse generator 13, respectively, as will be explained later. A controller 6 is formed of a digital computer which includes a computing processor 100, a ROM 101, a RAM 102, an oscillator 103, and input/output ports 60 and 61. Alternatively, the controller 6 may be designed to achieve these functional blocks by means of discrete electronic component parts.

The controller 6 calculates an operation value U, and it is sent out through a filter 81 (see FIGS. 2–3) and the output port 60 to the control object, in which the operation value is converted, at a D/A converter 51, into an analog signal, which is amplified by the power amplifier 14 for driving the motor 12. The pulse generator 13 produces a dispersed pulse signal Xp in response to the rotation of the motor 12, and it is sent to the input port 61 of the controller 6.

Figure 2:
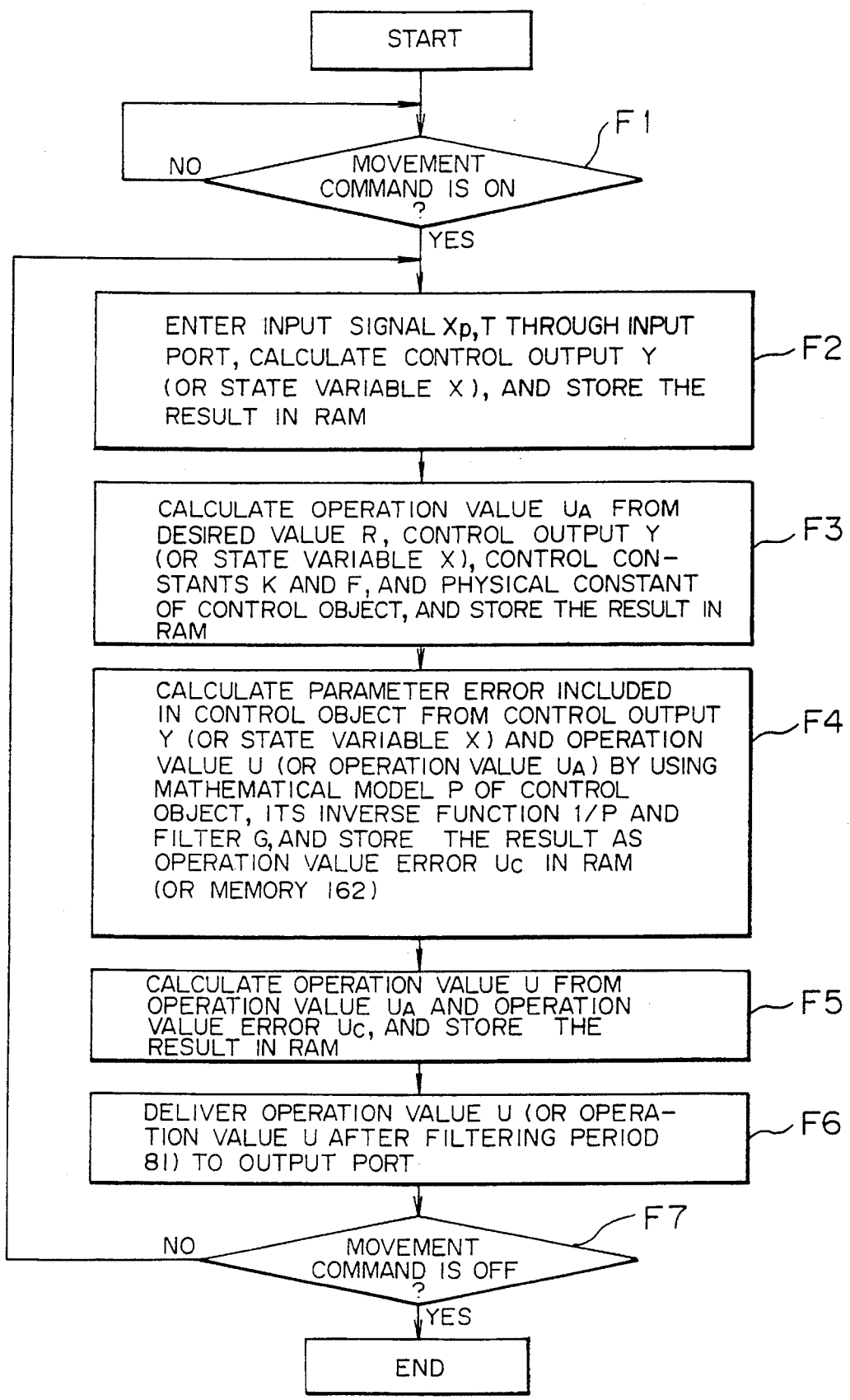
FIG. 2 is a flowchart showing the control method for a servo-mechanism based on this invention.

FIG. 2 is a flowchart showing the calculation of the operation value U by the controller 6. A series of operations from step F1 to step F7 is carried out in each sampling period of the controller 6.

Step F1 waits for the turn-on of the movement command, and after the command is turned on, step F2 reads Xp, T which has been entered through the input port and converts it into a control output Y (or state variable X). The control output includes values of speed and position.

The displacement Y since the movement command has been turned on until the present time point is evaluated as a product of the distance per pulse and the count value of Xp. The speed Y is evaluated as a product of the radius of the load and the reciprocal of the Xp pulse period which is measured by counting clock signals from the oscillator in the controller 6.

The next step F3 calculates the operation value $U_A$ for error reduction by using the desired value R, control output Y (or state variable X), control constant K, F, and physical constant of the control object. An example of calculation is as follows.

$U_a = K \cdot R - F_1 Y_1 - F_2 Y_2$ (the case of using the control outputs)

or $U_A = K \cdot R - F_1' X_1 - F_2' X_2$ (the case of using the state variables) where K and F are control constants.

The next step F4 calculates by inference the parameter error and disturbance in terms of he operation value included in the actual control object by using a mathematical model P of the control object, its inverse function 1/P and a filter G in the operation value modifier 3 and the control output Y (or state variable X) and operation value U (or operation value $U_A$.) The filter G may be placed on the input of the inverse function 1/P. Prior to the computation, the mathematical model P of the control object is established in the ideal condition where the parameter variation and disturbances are absent. This model is a transfer function having an input of the operation value and an output of the control output, and it is given as the following expression for example.

$$P(s) = \frac{rK_t}{JS^2}$$

where J is the moment of inertia of all rotating members including the load and motor, S is the complex parameter, r is the radius of the load, and Kt is the torque constant of the motor.

The operation value U equal to that of the actual control object is applied to the mathematical model P thereby to obtain the model-based control output $Y_M$ (values of speed and position). The difference between the $Y_M$ and the actual control output Y of the control object is evaluated, and it is converted to have the dimension of an operation value by using the inverse function 1/P of the model.

The resulting operation value error is based on the inference of the error of the operation value caused by the parameter variation of the control object and by disturbances.

Subsequently, the operation value error is fed through the filter G thereby to obtain an operation value error Uc. The filter G is a low-pass filter having a d.c. gain of unity, and it controls the passage of frequency components included in the operation value error signal. Specifically, when a wide frequency band is set for the filter G, it passes high frequency components of the signal, causing the motor to be supplied with a relatively large energy based on the compensation operation so that the load is driven quickly.

Generally, a control object involves a number of mechanical resonance modes, and the control system can be destroyed if the resonation of some mode emerges. Any motor and any power amplifier have limits of energy which they can treat. Accordingly, the frequency band of the filter G is set appropriately in consideration of these factors for an individual control system. For example, for a control system in which the parameter variation and disturbances are slow, a narrower frequency band is set for the filter G and the influence of the parameter variation and disturbances can be minimized while preventing the control system from becoming unstable. In addition, energy used for the compensation can be reduced, and it is effective for the stabilization and cost reduction of the control system.

The next step F5 calculates the operation value U from the operation value $U_A$ ! and operation value error Uc calculated in the previous steps F3 and F4, and stores the result in the RAM 102. Since the operation value U is rid of the influence of the parameter variation and disturbances, stable control can be performed.

The next step F6 delivers the operation value U by way of the filter 81 and output port 60. The filter 81 is a low-pass filter having a d.c. gain of unity as is the filter G mentioned above and it is intended to stabilize the control system. In case the controller 6 is formed of a digital computer, it is prone to create a quantization noise during the computation of steps F3 and F4 based on the quantized signals, and the filter 81, with its cutoff frequency being set higher than that of the filter G and lower than the mechanical resonance frequencies of the control object, stabilizes the control system effectively.

The last step F7 repeats the operations of the steps F2 to F6 until the control system completes the specified movement and the movement command is turned off. The series of operations shown in FIG. 2 terminates when the movement command is turned off.

Figure 3:
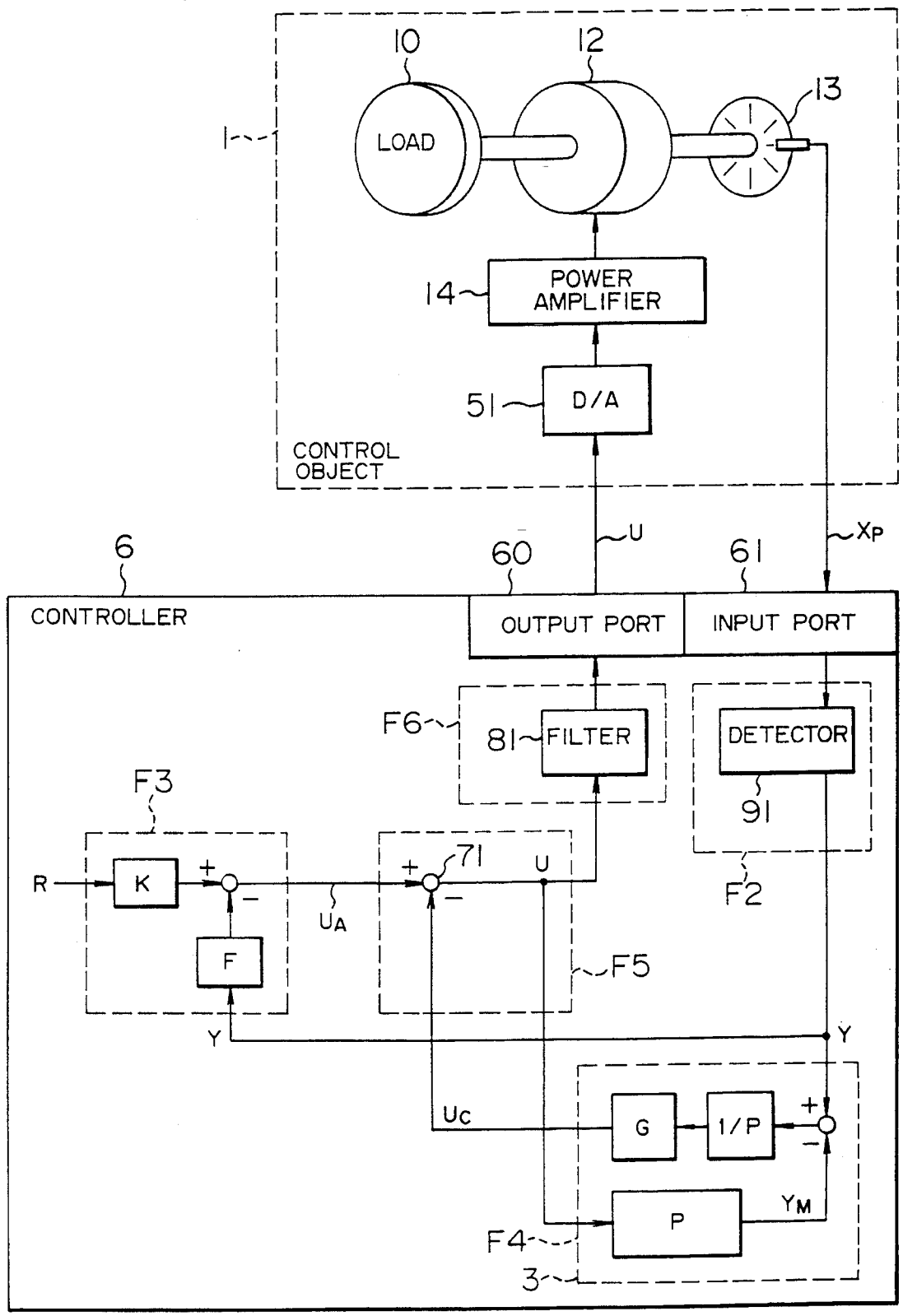
FIG. 3 is a block diagram showing the control system for a servo-mechanism based on an embodiment of this invention.

FIG. 3 is a block diagram showing the arrangement of calculating the operation value U to be applied to the motor 12 in FIG. 1 and it corresponds to the operations of steps F2 to F6 in FIG. 2.

Figure 4:
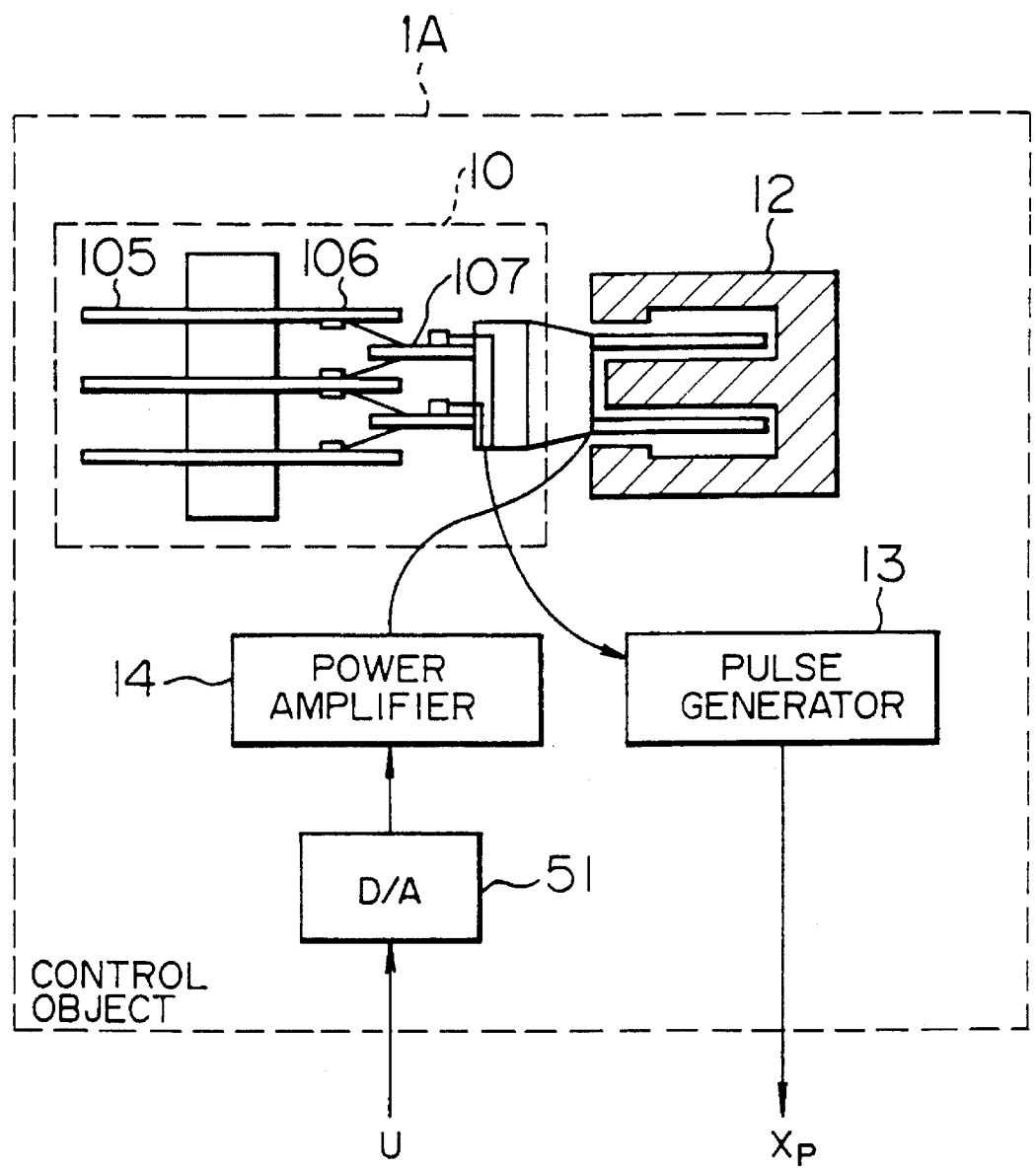
FIG. 4 is a block diagram showing the control object of the control system based on this invention.

FIG. 4 is a diagram showing in brief another example of the control object 1 in FIG. 1 and FIG. 3. The control object 1A of FIG. 4 is a magnetic disk memory unit, in which the load 10 consists of a disk stack 105 including a plurality of magnetic disks, a magnetic head 106 disposed over the disk of the disk stack for detecting the tracking signal, and a carriage 107 which supports the magnetic head 106. A motor 12 included in the control object of FIG. 4 is a voice-coil motor which performs linear movement and it moves the carriage 107 so that the magnetic head 106 is positioned to a specified track on the disk. The magnetic head 106 has its outputs sent to a pulse generator 13, which produces a pulse signal Xp indicative of the track position. The operations of the power amplifier 14 and A/D converter 51 are identical to the arrangement of FIG. 3. A controller 6 connected to the control object 1A is identical to that of FIG. 3. Accordingly, this invention can be applied not only to a control object of the rotary servo-mechanism type, but it is also applicable to a control object of the linear motion type.

The operation value U for the motor 12 in FIG. 4 is calculated in accordance with the flowchart of FIG. 2. The operations of steps F1 to F4 are identical to the preceding embodiment of FIG. 3, except that the mathematical model P used in the step F3 is expressed as follows.

$P(S) = F/MS^2$ where M is the mass of the load, and F is the force constant of the motor.

Figure 5:
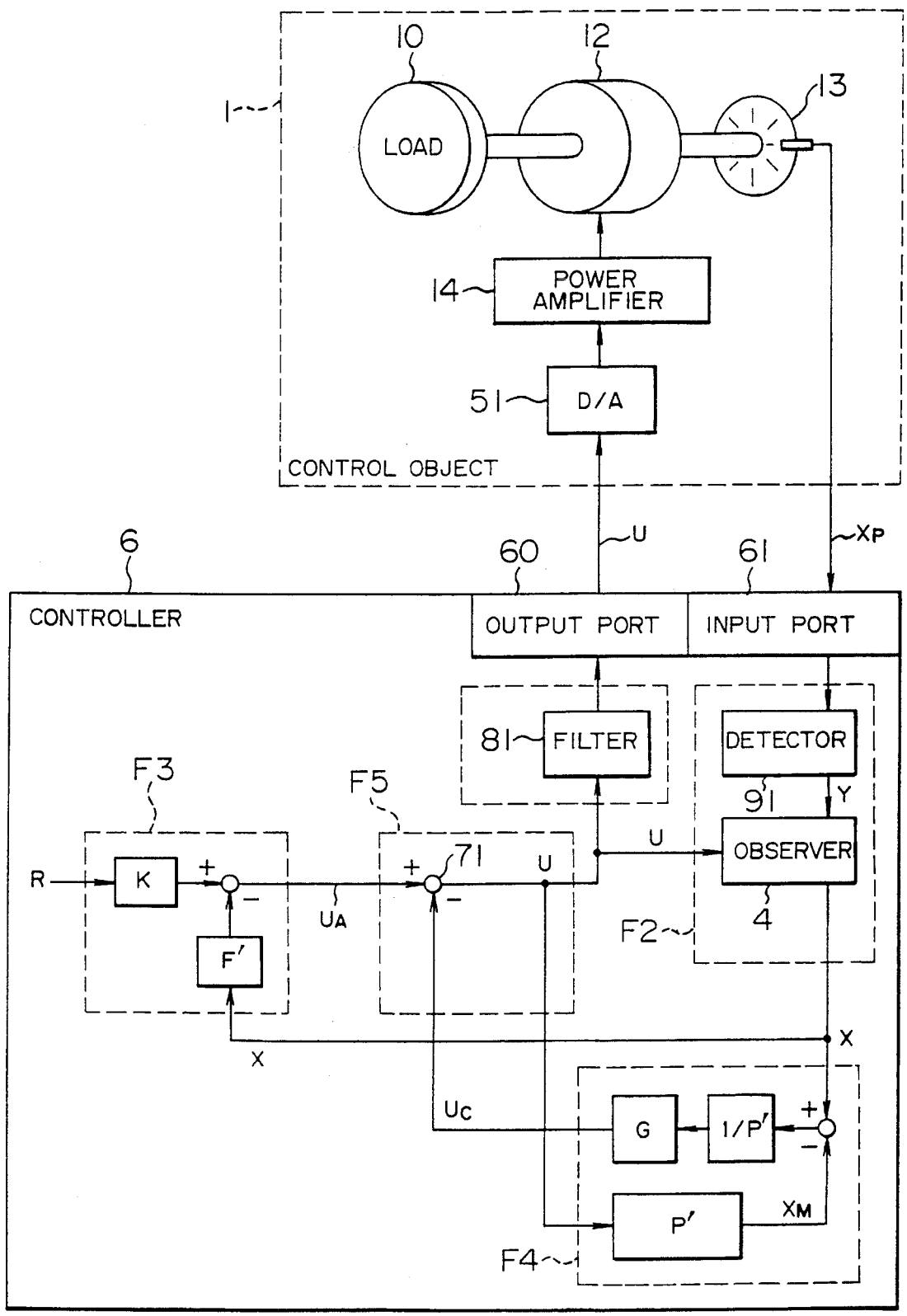
FIG. 5 is a block diagram showing the control system based on another embodiment of this invention.

FIG. 5 is a block diagram showing another embodiment of this invention, which is identical to the embodiment of FIG. 3, except that an observer 4 is added at the output of detector 91.

The detected value Y provided by a position detector such as the pulse generator 13 unavoidably has a time lag. The presence of time lag in the control loop can be a cause of instability of the control system, and on this account the observer 4 reduces the time lag of the detected value Y and the resulting inferred value or state variable is used to stabilize the control system. A specific arrangement of the observer useful for the reduction of time lag or the interpolation of the pulse signal Xp produced by a rotary encoder or pulse generator is described in the copending U.S. Patent application Ser. No. 07/853,947 filed on Mar. 19, 1992, which is incorporated herein by reference.

Figure 6:
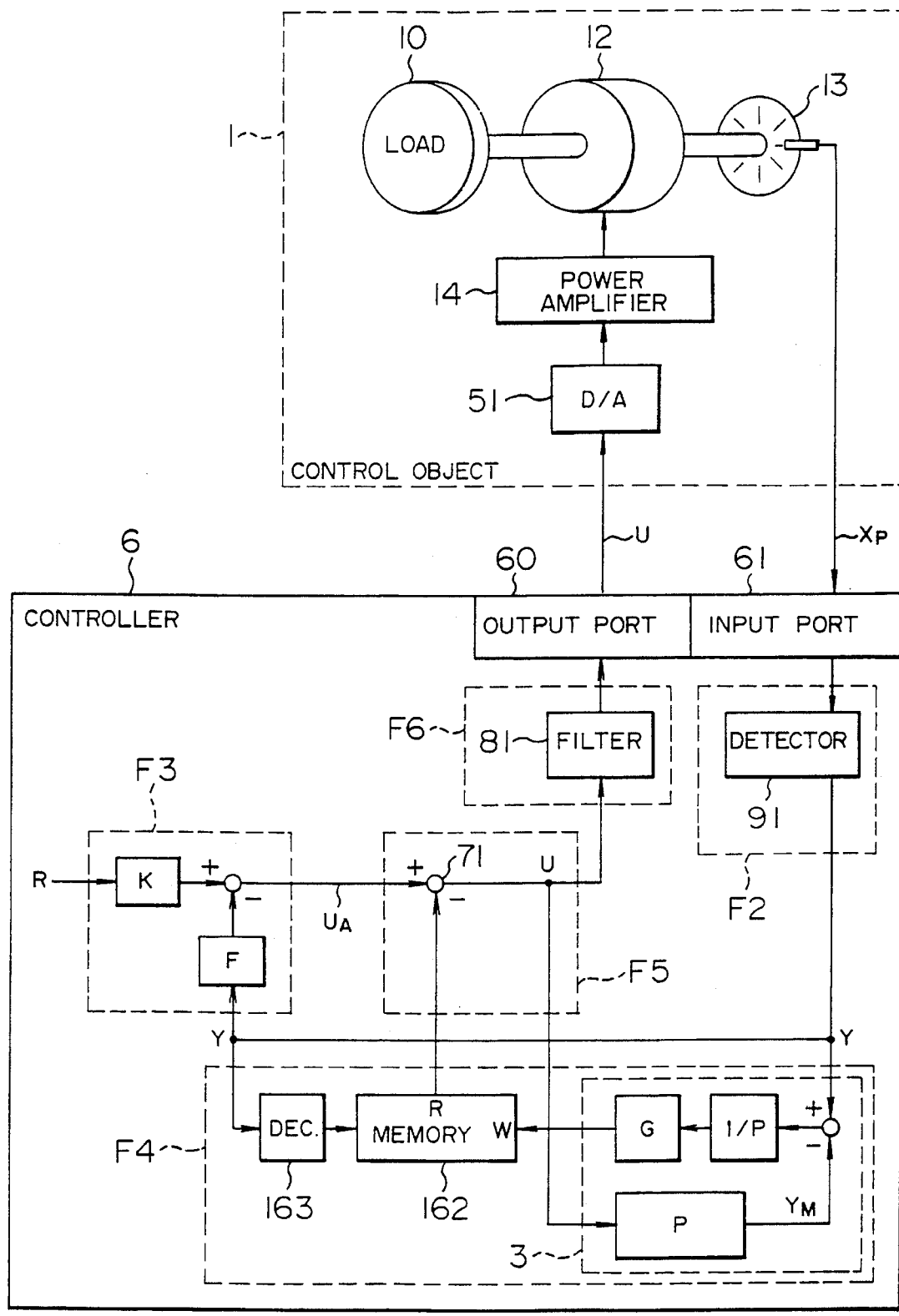
FIG. 6 is a block diagram showing the control system based on still another embodiment of this invention.

FIG. 6 is a block diagram showing another embodiment of this invention, which is derived from the embodiment of FIG. 3 with the addition of a memory 162 and an address decoder 163. A detector 91 has its detected value Y decoded by the address decoder 163, and the operation value error Uc is stored in the location of the decoded address of the memory 162. After the operation value errors Uc for all detected values Y within the control range have been stored in the memory 162, the operation value modifier 3 made up of the mathematical model P, its inverse function 1/P and filter G can be removed from the controller 6. After the operation value modifier 3 has been removed, the output value Uc is read out of the memory 162 depending on the detected value Y and sent to a subtracter 71. Consequently, the operational duty of the processor 100 in the controller 6 can be relaxed.

The detected value Y is used as the address signal of the memory 162 in the following movement operation of the control system, and the output Uc stored in the memory 162 is read out and used for the compensation against the variation of characteristics and disturbances. This arrangement performs a feed-forward compensation and it is effective for the stabilization of the control system. A digital control system detects the operation value and control output discontinuously, and by storing the operation value error Uc at each time point in the memory 162 and using the averaged operation value error, it is possible for the operation value modifier 3 to eliminate the error caused by the inference of the operation value error. Although this embodiment is not sharply responsive to the variation of characteristics of the control object and disturbances, it effectively reduces the sensitivity of the control system to the variation of characteristics and disturbances which occur slowly and also enhances the stability. The provision of the memory 162 is applicable to the embodiment of FIG. 8, as will be explained later, which does not need the mathematical model P.

Figure 7:
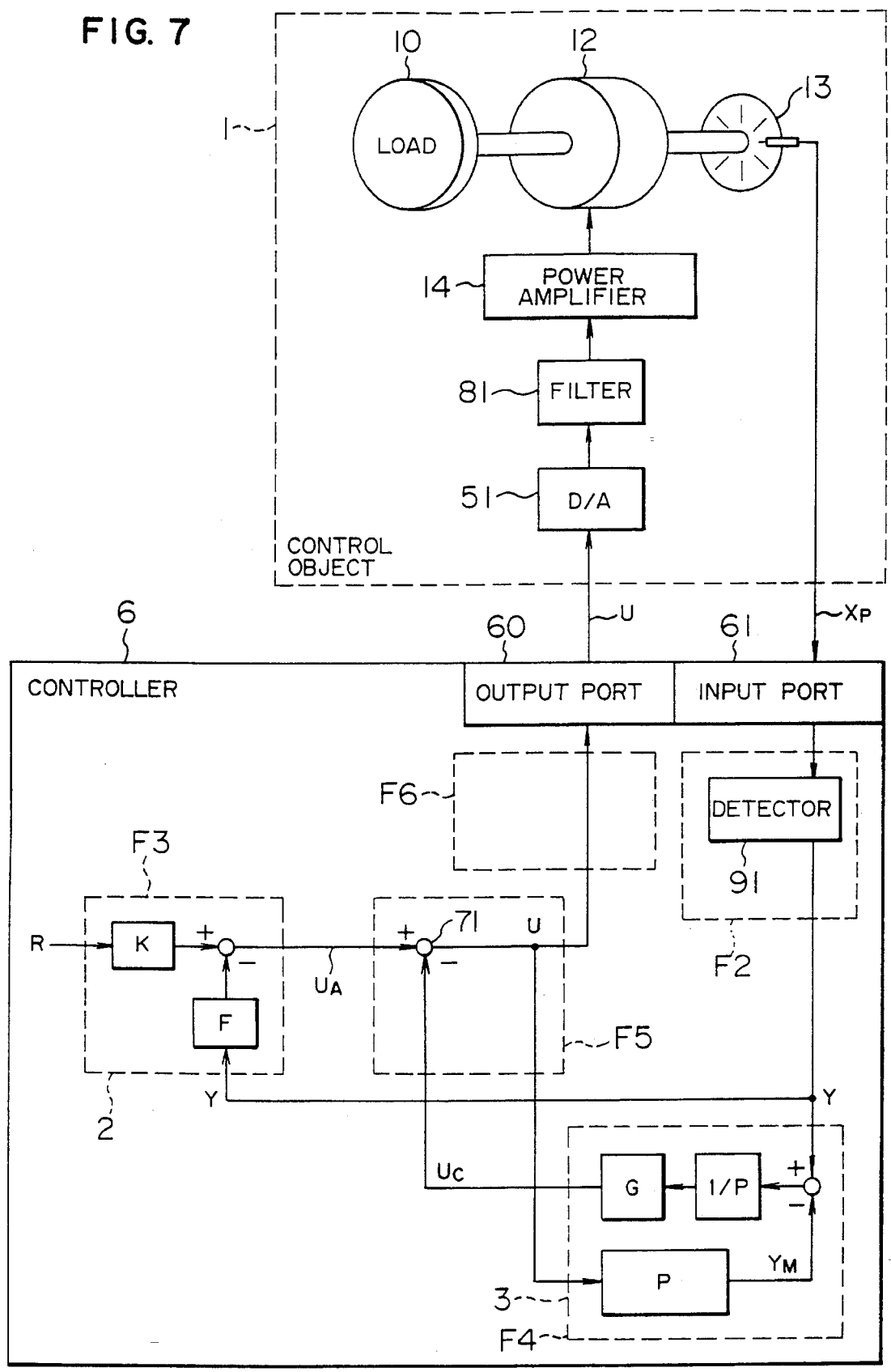
FIG. 7 is a block diagram showing the control system based on still another embodiment of this invention.

FIG. 7 is a block diagram showing another embodiment of this invention, which is derived from the embodiment of FIG. 3, with the filter 81 being placed outside of the controller 6. The filter 81 has the highest cutoff frequency as compared with those of the operation value producer 2, operation value modifier 3 and filter G in the controller 6, and also has a wide frequency band. Therefore, when the controller 6 is formed of a digital computer, it necessitates the highest computation speed and highest computation accuracy, e.g., a sampling frequency on the order of 10 kHz. The design condition of the controller 6 for the computation speed and accuracy can be relaxed significantly when the filter 81 is provided as an external component of the controller 6. In this case, the sampling frequency can be lowered down to the order of 50 Hz, for example.

Figure 8:
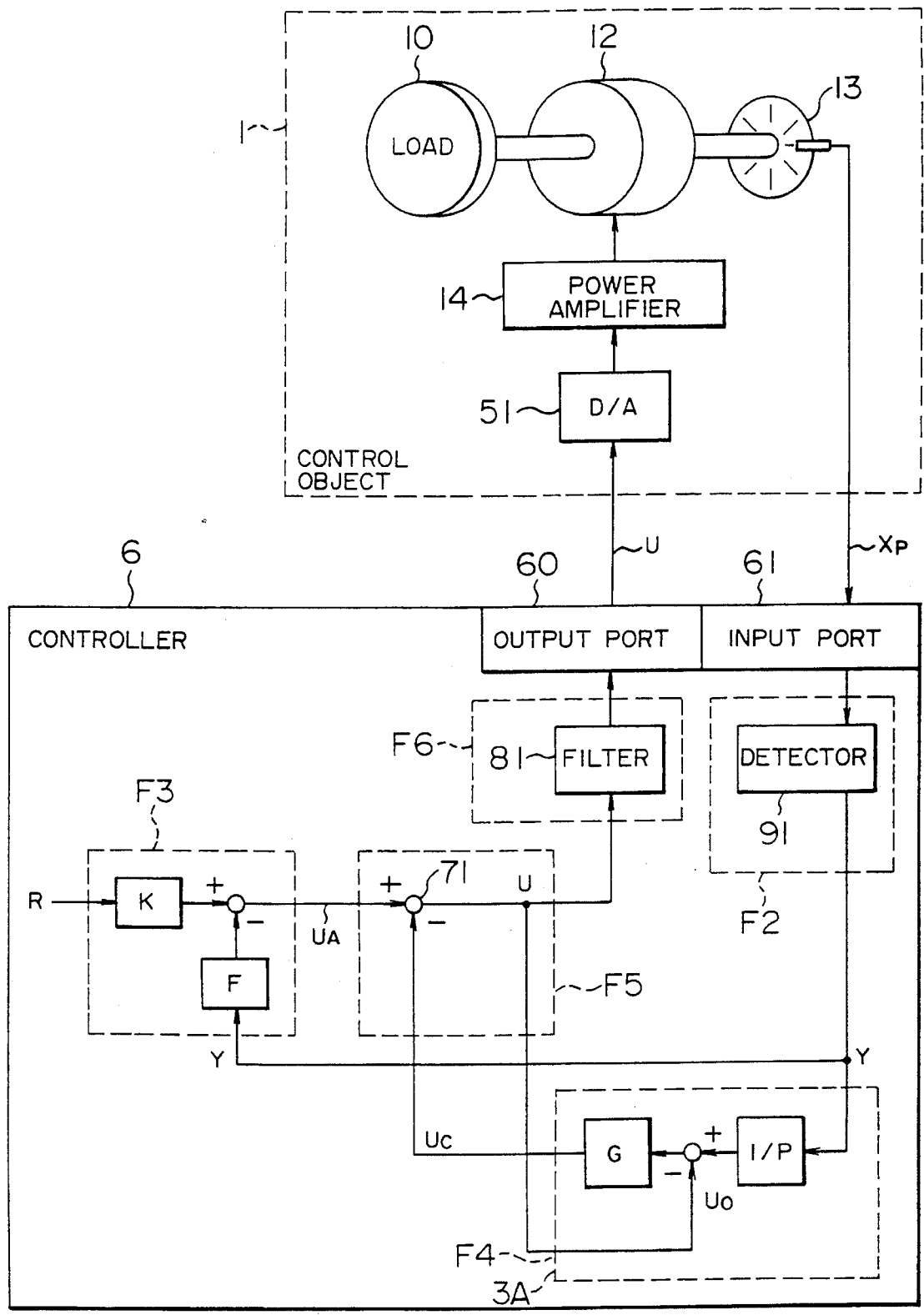
FIG. 8 is a block diagram showing the control system based on still another embodiment of this invention.

FIG. 8 is a block diagram showing another embodiment of this invention, which is a modified version of the embodiment shown in FIG. 3. The operation value modifier 3A of this embodiment is different from the one 3 of FIG. 3. The operation value modifier 3A receives the detected control output Y and calculates a model-based operation value Uo, which is assumed to produce the control output Y, by using only the inverse function 1/P of the mathematical model P, in contrast to the comparison of the model-based control output with the detected value in the embodiment of FIG. 3. The difference between the operation value U and the model-based operation value Uo is fed through the filter G, and the resulting value is delivered as the operation value error Uc. Accordingly, the step F4 of FIG. 2 is altered to the operation described above. This embodiment eliminates the need for the mathematical model P, and the volume of computation implemented by the operation value modifier 3A in the controller 6 can be reduced significantly as compared with the arrangement of FIG. 3. This improvement is particularly significant when the control object is a complex mechanism such as a magnetic tape memory unit, for example, as will be explained later in connection with FIG. 11.

Figure 9:
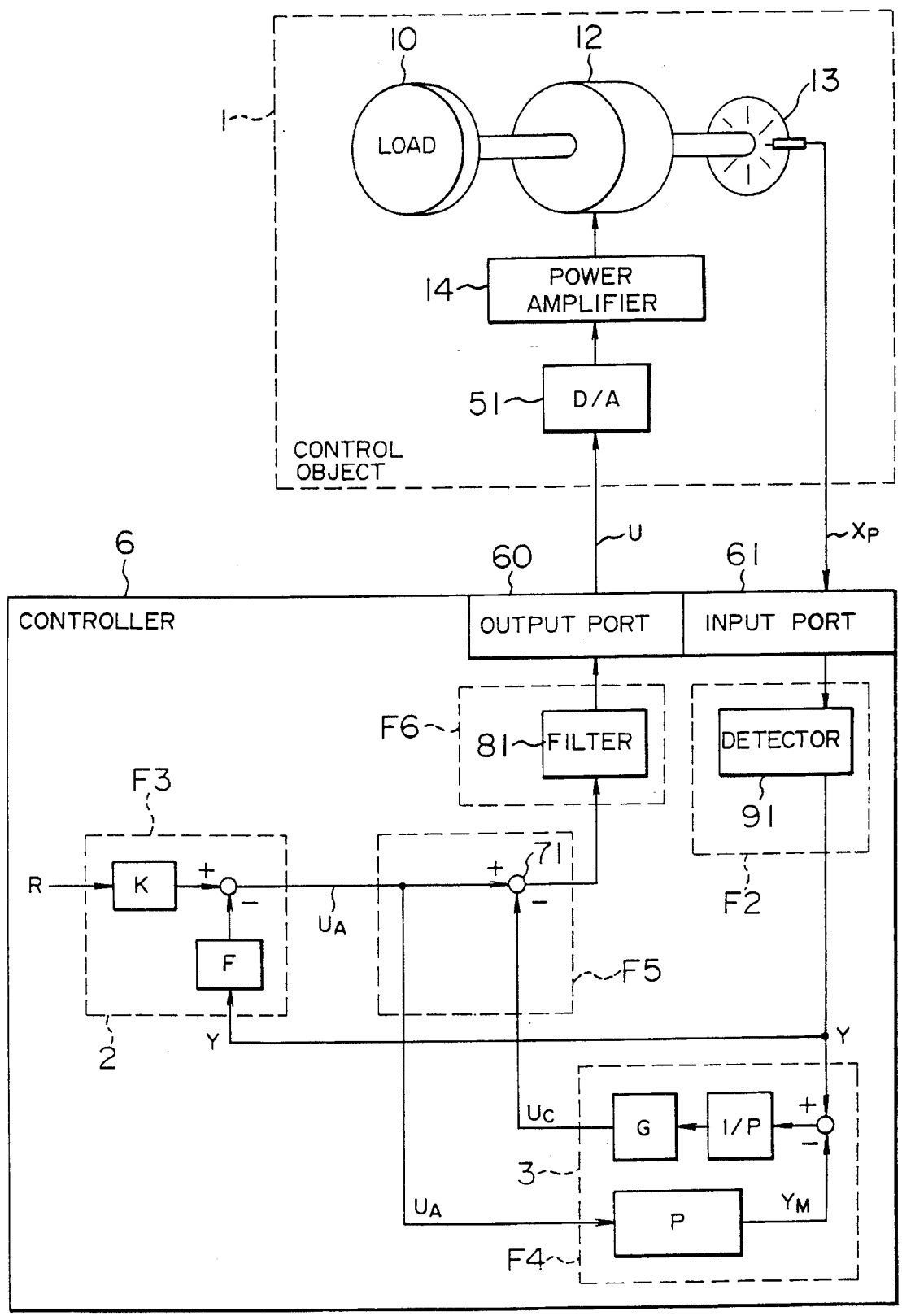
FIG. 9 is a block diagram showing the control system based on still another embodiment of this invention.

FIG. 9 is a block diagram showing another embodiment of this invention, which is different from the embodiment of FIG. 3 in that the input to the mathematical model P of the operation value modifier 3 is derived from the output $U_A$ of the operation value producer 2, in place of the operation value U. A similar effect to FIG. 3 can be obtained by the embodiment of FIG. 9. The flowchart of FIG. 2 showing the operation of FIG. 3 is applied intact to this embodiment.

Figure 10:
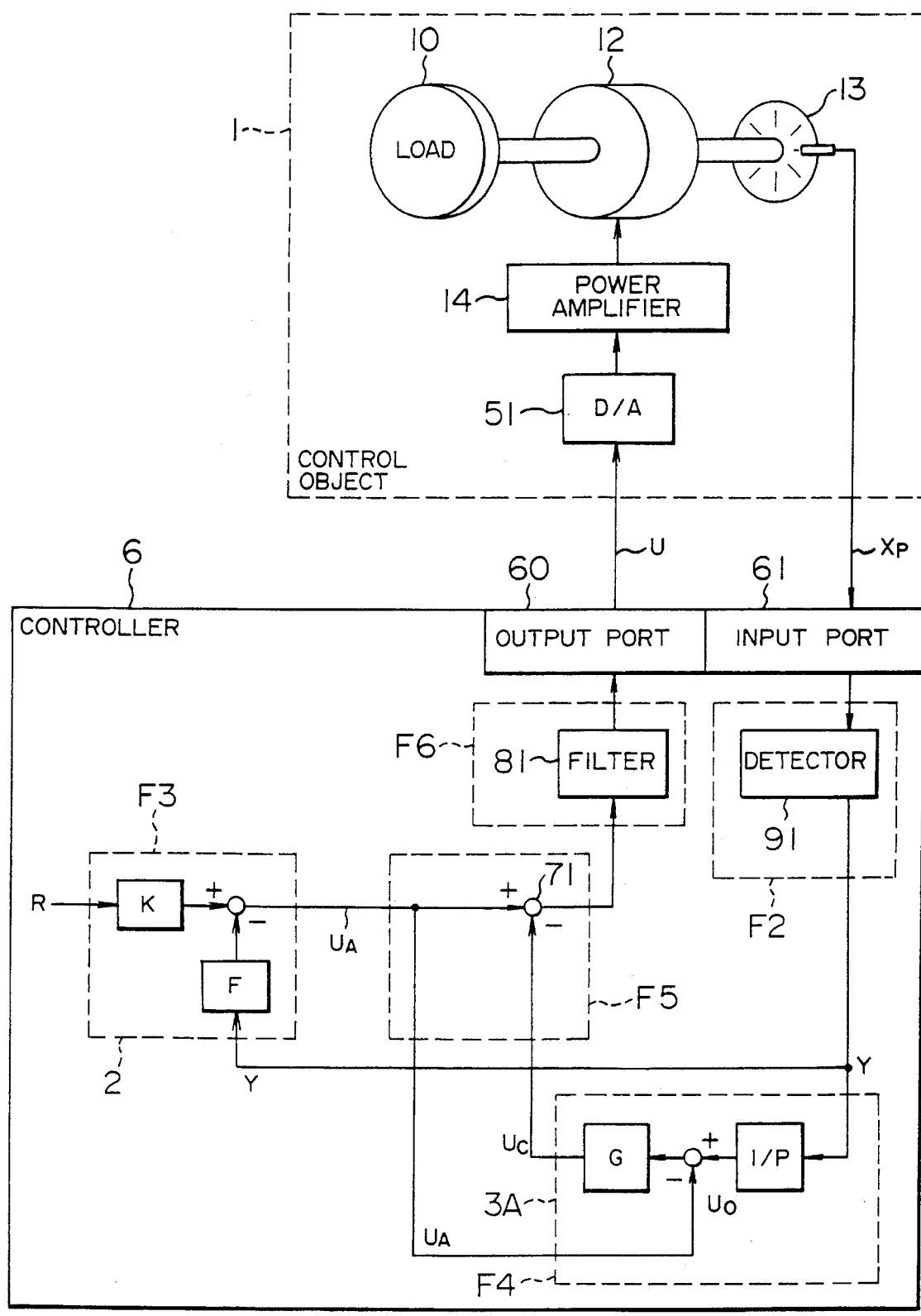
FIG. 10 is a block diagram showing the control system based on still another embodiment of this invention.

FIG. 10 is a block diagram showing another embodiment of this invention, which is a modified version of the embodiment shown in FIG. 9. This embodiment is different from that of FIG. 9 in that the mathematical model P of the operation value modifier 3 in the controller 6 is eliminated. The output $U_A$ Of the operation value producer 2 is subtracted from the output Uo of the inverse function of the mathematical model P, and the difference is delivered through the filter G as the output Uc. The operation value U is produced at the subtracter 71 by subtracting the output Uc from the output $U_A$ of the operation value producer 2. Accordingly, the embodiment of FIG. 10 can produce a similar effect to that of FIG. 9 with a simpler structure as compared with FIG. 9. No alteration is needed to apply the flowchart in FIG. 2 showing the operation of FIG. 3 to this embodiment.

Figure 11:
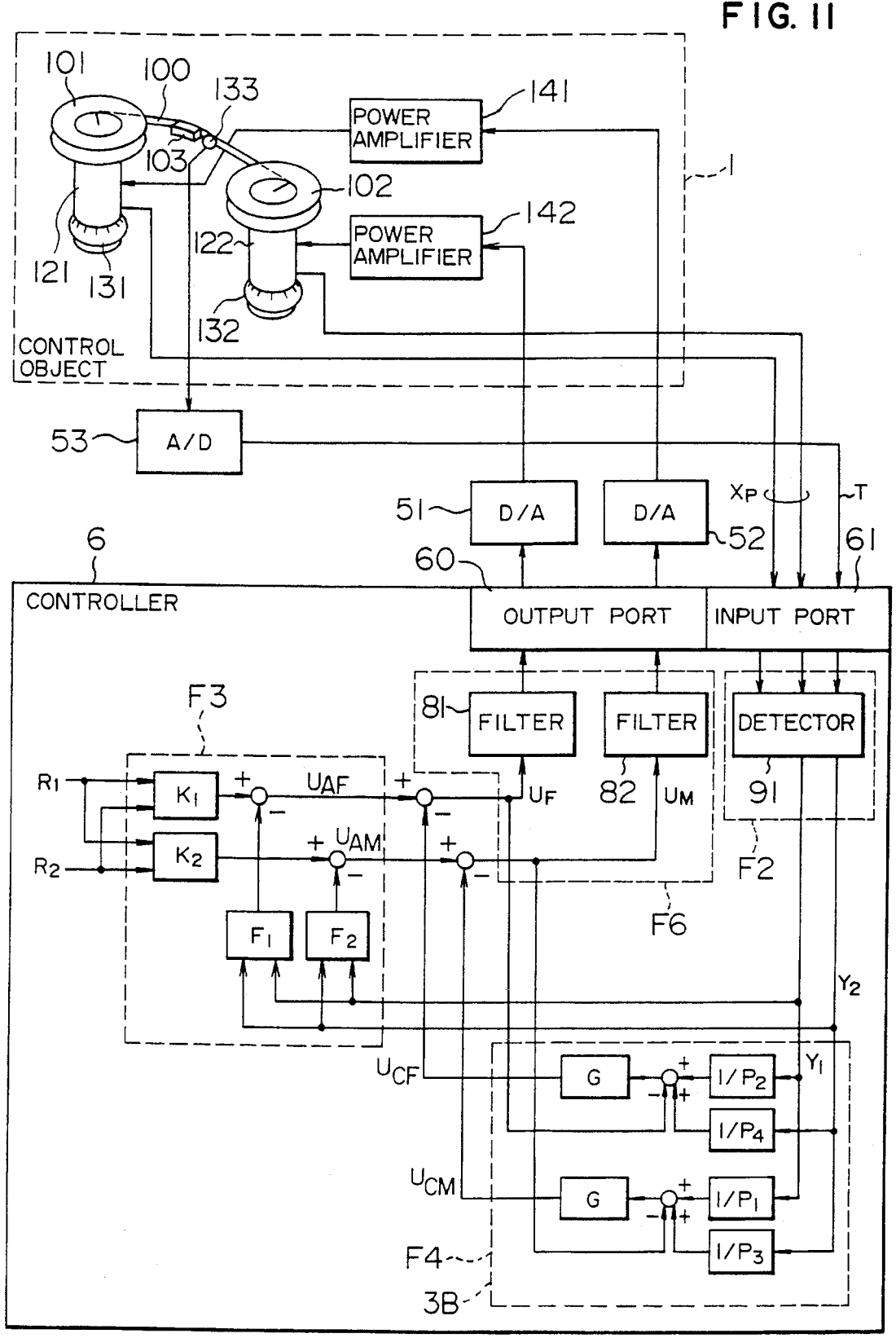
FIG. 11 is a block diagram showing the control system based on still another embodiment of this invention.
Figure 12:
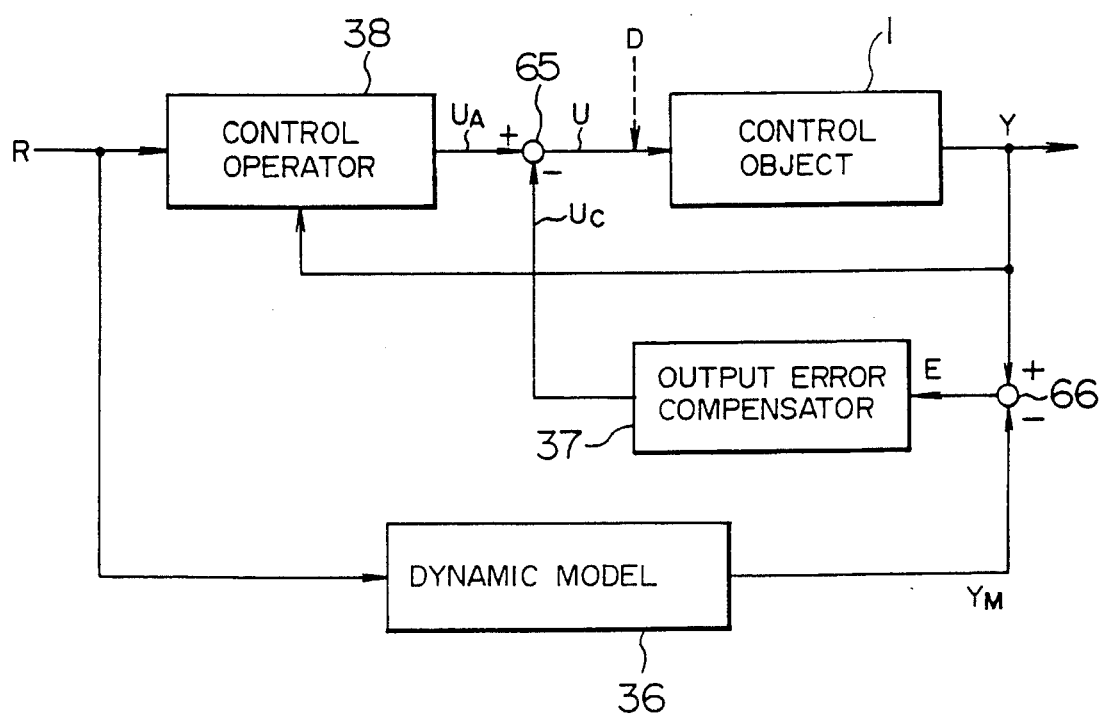
FIG. 12 is a block diagram showing the arrangement of the conventional control system for a servo-mechanism.

FIG. 11 shows an embodiment of the case where the control object 1 of FIG. 8 is replaced with a magnetic tape memory unit. The load includes two reels 101 and 102, a magnetic tape 100 wound on these reels, and a magnetic head 103 which records and reproduces data on the magnetic tape. The magnetic head 103 is either a fixed head or rotary head. Motors 121 and 122 are operated to drive the two reels so that the magnetic tape 100 is moved past the magnetic head 103. Pulse generators 131 and 132 are rotary encoders, which generate pulse signals Xp at certain rotational angles of the reels during the movement of the magnetic tape. A tension sensor 133 is used to detect the tension of the magnetic tape 100, and the detected value T is delivered through an A/D converter 53 to the I/O port 61 of the controller 6. This magnetic tape memory unit has two motor drive systems which include individual D/A converters 51 and 52, filters 81 and 82, and power amplifiers 141 and 142. Operation values $U_M$ and $U_F$ for driving the two motors are calculated by the controller 6 in accordance with the flowchart of FIG. 2 as follows.

In steps F2 and F3 of FIG. 2, the detector 91 evaluates the tape speed Y1 from the pulse signal Xp and the tape tension Y2 from the detected tension signal T, and the controller introduces these values and calculates the operation value $U_A$ ($U_{AM}$ and $U_{AF}$) for driving the motors 121 and 122. This control system has control outputs of the tape speed Y1 and tension Y2 for the respective desired values R1 and R2. The control operation is described in detail in U.S. Pat. Nos. 4,786,992 and 5,032,938, both of which all are incorporated by reference. In step F4, the operation value modifier 3B calculates by inference the influence of the variation of characteristics of the magnetic tape memory unit and disturbances in terms of the operation value. Because of the two motor drive systems, the mathematical model P is expressed as four transfer functions which represent ratios of two control outputs to two operation values as follows.

Mathematical model $P_1(S)$ of $Y_1$ to $U_M$:

$$P_1(S) = \frac{r_1 K_t}{J_1} \left( S^2 + 2Ks \frac{r_2^2}{J_2} \right) / \Delta(S)$$

$$\Delta(S) = S \left( S^2 + Ks \left( \frac{r_1^2}{J_1} + \frac{r_2^2}{J_2} \right) \right)$$

Mathematical model $P_2(S)$ of $Y_1$ to $U_F$:

$$P_2(S) = \frac{r_2 K_t}{J_2} \left( S^2 + 2Ks \frac{r_1^2}{J_1} \right) / \Delta(S)$$

Mathematical model $P_3(S)$ of $Y_2$ to $U_M$:

$$P_3(S) = 2Ks \cdot \frac{r_1 K_t}{J_1} \cdot S/\Delta(S)$$

Mathematical model $P_4(S)$ of $Y_2$ to $U_F$:

$$P_4(S) = -2Ks \cdot \frac{r_2 K_t}{J_2} \cdot S/\Delta(S)$$

where $r_1$ and $R_2$ are the radiuses of the reels, $J_1$ and $J_2$ are the total moment of inertia of the motors and loads, $K_t$ is the motor torque constant, and Ks is the spring constant of the magnetic tape.

Inference values of the variation of characteristics and disturbances in terms of the speed and position are calculated correspondingly, and the resulting values $U_{CM}$ and $U_{CF}$ are compared with the corresponding controller outputs $U_{AM}$ and $U_{AF}$ and characteristic values $U_M$ and $U_F$ in terms of the speed and position are evaluated.

The operations of subsequent steps F5 and F6 are identical to the embodiment of FIG. 8. This embodiment reduces the sensitivity of the control system against the variation of component parts such as motors which constitute the magnetic tape unit and the variation of the frictional force of the motor bearing and the frictional force of the running tape, and the variation among magnetic tapes, and the influence of calculation error of the control constant, whereby the control output can be stabilized effectively.

This embodiment reduces the sensitivity of the control system against the variation of the force constant of the voice-coil motor and the frictional force of the carriage, both constituting the magnetic disk memory unit, and disturbances emerging outside the unit and the calculation error of the control constant, whereby the control output can be stabilized effectively.

We claim:

1. A control apparatus for controlling a servo-mechanism, the servo-mechanism including a control object, the control object having an input for receiving a first operation signal and an output for outputting a control signal in response to the first operation signal, the control apparatus comprising:

a first control signal loop including
the control object,
detecting means for detecting the control signal from the control object and generating an actual control signal representing the detected control signal, and
means, responsive to the actual control signal and a desired control signal representing a control signal desired to be output from the control object, for generating a second operation signal for causing the actual control signal to become equal to the desired control signal; and a second control signal loop including the control object, the detecting means, means, responsive to the actual control signal and the first operation signal, for generating a model-based operation signal, and means, responsive to the second operation signal and the model-based operation signal, for generating the first operation signal such that the first operation signal causes the second operation signal to become equal to the model-based operation signal.

2. A control apparatus according to claim 1, wherein the means for generating a model-based operation signal includes:

means, responsive to the first operation signal, for generating a model-based control signal based on a transfer function of a mathematical model of the control object;

means, responsive to the detected control signal and the model-based control signal, for generating an intermediate model-based operation signal based on an inverse function of the transfer function of the mathematical model of the control object; and means, responsive to the intermediate model-based operation signal, for generating the model-based operation signal by filtering out frequency components of the intermediate model-based operation signal having a frequency higher than a predetermined frequency.

3. A control apparatus according to claim 1, wherein at least the second control signal loop further includes an observer, connected to the detecting means, for correcting a time lag in the detected control signal.

4. A control apparatus according to claim 1, wherein the means for generating a model-based operation signal includes:

means, responsive to the detected control signal, for generating a first intermediate model-based operation signal based on an inverse function of a transfer function of a mathematical model of the control object;

means, responsive to the first operation signal and the first intermediate model-based operation signal, for generating a second intermediate model-based operation signal for causing the first operation signal to become equal to the first intermediate model-based operation signal; and means, responsive to the second intermediate model-based operation signal, for generating the model-based operation signal by filtering out frequency components of the second intermediate model-based operation signal having a frequency higher than a predetermined frequency.

5. A control apparatus for controlling a servo-mechanism, the servo-mechanism including a control object, the control object having an input for receiving a first operation signal and an output for outputting a control signal in response to the first operation signal, the control apparatus comprising:

a first control signal loop including the control object, detecting means for detecting the control signal from the control object and generating an actual control signal representing the detected control signal, and means, responsive to the actual control signal and a desired control signal representing a control signal desired to be output from the control object, for generating a second operation signal for causing the actual control signal to become equal to the desired control signal; and a second control signal loop including the control object, the detecting means, means, responsive to the actual control signal and the second operation signal, for generating a model-based operation signal, and means, responsive to the second operation signal and the model-based operation signal, for generating the first operation signal such that the first operation signal causes the second operation signal to become equal to the model-based operation signal.

6. A control apparatus according to claim 5, wherein the means for generating a model-based operation signal includes:

means, responsive to the second operation signal, for generating a model-based control signal based on a transfer function of a mathematical model of the control object;

means, responsive to the detected control signal and the model-based control signal, for generating an intermediate model-based operation signal based on an inverse function of the transfer function of the mathematical model of the control object; and means, responsive to the intermediate model-based operation signal, for generating the model-based operation signal by filtering out frequency components of the intermediate model-based operation signal having a frequency higher than a predetermined frequency.

7. A control apparatus according to claim 5, wherein the means for generating a model-based operation signal includes:

means, responsive to the detected control signal, for generating a first intermediate model-based operation signal based on an inverse function of a transfer function of a mathematical model of the control object;

means, responsive to the second operation signal and the first intermediate model-based operation signal, for generating a second intermediate model-based operation signal for causing the second operation signal to become equal to the first intermediate model-based operation signal; and means, responsive to the second intermediate model-based operation signal, for generating the model-based operation signal by filtering out frequency components of the second intermediate model-based operation signal having a frequency higher than a predetermined frequency.

* * * * *